US012101620B2

(12) United States Patent
Narula et al.

(10) Patent No.: US 12,101,620 B2
(45) Date of Patent: Sep. 24, 2024

(54) SOUND DOSAGE MONITORING AND REMEDIATION SYSTEM AND METHOD FOR AUDIO WELLNESS

(71) Applicant: Dell Products, L.P., Round Rock, TX (US)

(72) Inventors: Harpreet Narula, Austin, TX (US); Karun Palicherla Reddy, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 132 days.

(21) Appl. No.: 17/808,374

(22) Filed: Jun. 23, 2022

(65) Prior Publication Data

US 2023/0421980 A1 Dec. 28, 2023

(51) Int. Cl.

| | |
|---|---|
| ***H04R 1/00*** | (2006.01) |
| ***H04R 1/10*** | (2006.01) |
| ***H04R 5/04*** | (2006.01) |
| ***H04S 3/00*** | (2006.01) |
| ***H04S 7/00*** | (2006.01) |

(52) U.S. Cl.

CPC ........... *H04S 7/302* (2013.01); *H04R 1/1083* (2013.01); *H04R 5/04* (2013.01); *H04S 3/008* (2013.01); *H04S 2400/13* (2013.01); *H04S 2420/01* (2013.01)

(58) Field of Classification Search

CPC ........ H04R 29/00–001; H04R 2225/61; H04R 2225/41; H04R 1/1083; A61B 5/12

USPC ........................................ 381/72, 74, 56–57

See application file for complete search history.

(56) References Cited

U.S. PATENT DOCUMENTS

| | | | | |
|---|---|---|---|---|
| 11,347,966 | B2 * | 5/2022 | Lee | G10L 15/16 |
| 11,437,966 | B2 * | 9/2022 | Lynch | H03G 3/3005 |
| 11,701,516 | B2 * | 7/2023 | Boven | A61N 1/36038 607/57 |
| 2022/0035593 | A1 * | 2/2022 | Lee | G10L 21/0316 |
| 2022/0313089 | A1 * | 10/2022 | Burwinkel | H04R 29/008 |

* cited by examiner

*Primary Examiner* — Disler Paul

(74) *Attorney, Agent, or Firm* — Fogarty

(57) ABSTRACT

Embodiments of systems and methods for managing performance optimization of applications executed by an Information Handling System (IHS) are described. In an illustrative, non-limiting embodiment, an IHS may include computer-executable instructions to receive, by a personal audio device, a plurality of measurements associated with an audio dosage level incurred by a user over a specified period of time, and determine that a cumulative audio dosage level for the specified period of time is excessive. A first portion of the measurements obtained when the audio dosage level is generated by a first audio source and a second portion of the measurements obtained when the audio dosage level is generated by a second audio source. Additionally, the cumulative audio dosage level obtained by combining the first portion and second portion of measurements. When the cumulative audio dosage level is excessive, perform one or more remedial actions to reduce the audio dosage level.

20 Claims, 4 Drawing Sheets

SOUND DOSAGE MONITORING AND REMEDIATION SYSTEM AND METHOD FOR AUDIO WELLNESS

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs can execute many diverse types of applications. In some IHSs, a machine learning (ML) engine (e.g., optimization engine) may be used to improve application performance by dynamically adjusting IHS settings. Particularly, a ML engine may apply a profile to adjust the operation of certain resources of the IHS, such as the operating system (OS), hardware resources (e.g., central processing units (CPUs), graphics processing units (GPUs), storage, etc.), or drivers used to interface with those hardware resources, or other applications that may be executed by the IHS.

To enhance user experience, IHSs may be configured with personal audio devices (e.g., earbuds, headsets, etc.) to enhance audio content that is provided to users. IHSs typically communicate with their associated personal audio devices using wired communications or wireless communication links. To establish a wireless communication link between an IHS, such as a personal computer and a personal audio device using, for example, a Bluetooth link, a Bluetooth-enabled personal audio device is paired with its host computer to form a secure digital-based communication link that is relatively noise free. The personal audio devices may also be paired with other user devices, such as cellphones, tablets, work computers so that the usefulness of the personal audio devices may be extended to other devices managed by the user.

SUMMARY

Embodiments of systems and methods for managing performance optimization of applications executed by an Information Handling System (IHS) are described. In an illustrative, non-limiting embodiment, an IHS may include computer-executable instructions to receive, by a personal audio device, a plurality of measurements associated with an audio dosage level incurred by a user over a specified period of time, and determine that a cumulative audio dosage level for the specified period of time is excessive. A first portion of the measurements obtained when the audio dosage level is generated by a first audio source and a second portion of the measurements obtained when the audio dosage level is generated by a second audio source. Additionally, the cumulative audio dosage level obtained by combining the first portion and second portion of measurements. When the cumulative audio dosage level is excessive, perform one or more remedial actions to reduce the audio dosage level.

According to another embodiment, a method includes the steps of receiving, by a personal audio device, a plurality of measurements associated with an audio dosage level incurred by a user over a specified period of time, and determining that a cumulative audio dosage level for the specified period of time is excessive. A first portion of the measurements are obtained when the audio dosage level is generated by a first audio source and a second portion of the measurements obtained when the audio dosage level is generated by a second audio source. Additionally, the cumulative audio dosage level is obtained by combining the first portion and second portion of measurements. The method further includes the step of performing one or more remedial actions to reduce the audio dosage level when the cumulative audio dosage level is excessive.

According to yet another embodiment, a memory storage device has program instructions stored thereon that, upon execution by one or more processors of an Information Handling System (IHS), cause the IHS to receive, by a personal audio device, a plurality of measurements associated with an audio dosage level incurred by a user over a specified period of time, determine that a cumulative audio dosage level for the specified period of time is excessive, and, perform one or more remedial actions to reduce the audio dosage level when the cumulative audio dosage level is excessive. A first portion of the measurements are obtained when the audio dosage level is generated by a first audio source and a second portion of the measurements are obtained when the audio dosage level is generated by a second audio source. The cumulative audio dosage level is also obtained by combining the first portion and second portion of measurements.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
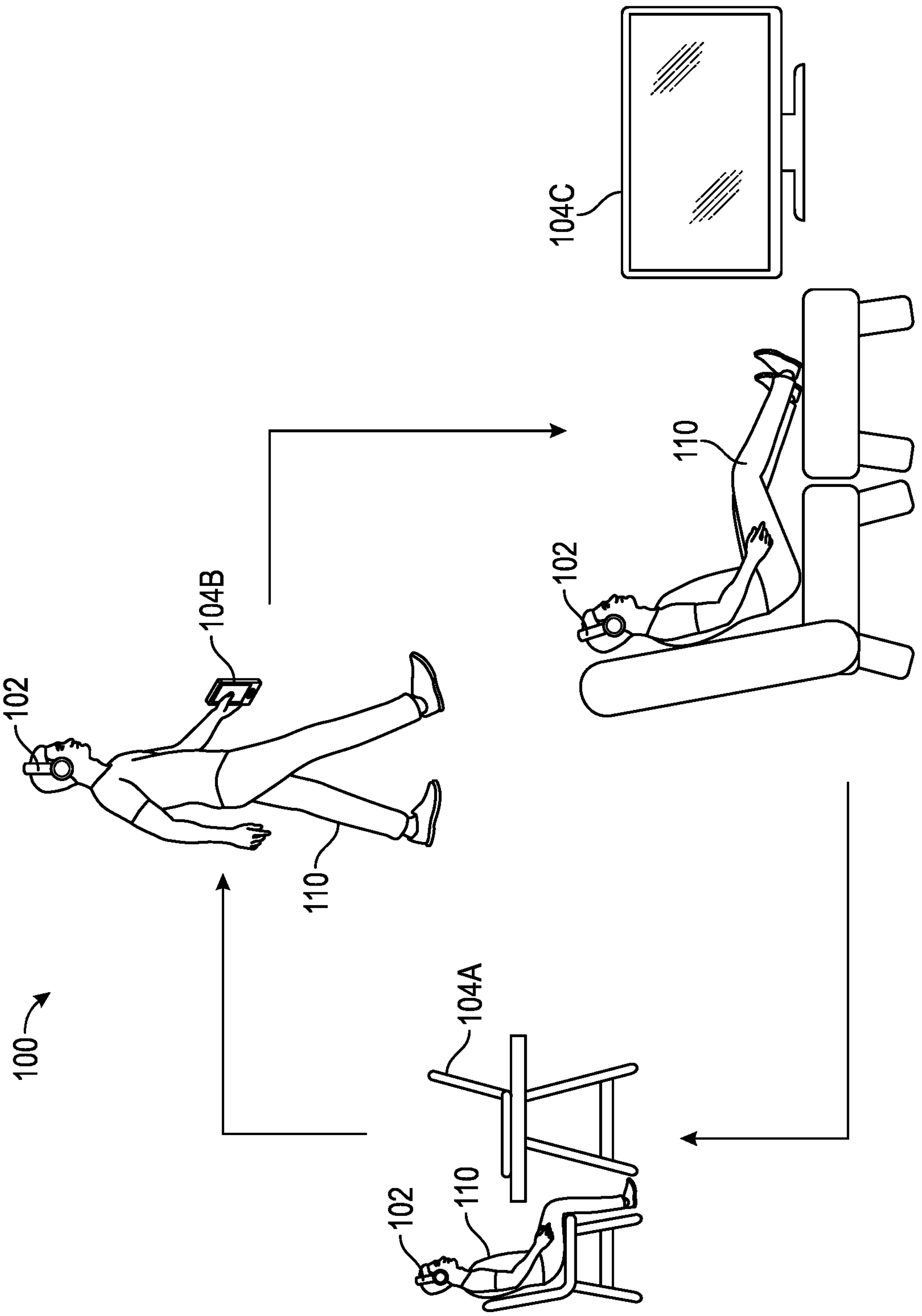
FIG. 1 illustrates an example sound dosage monitoring and remediation system that may be used to continually monitor audio dosage levels incurred by user across different devices according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Embodiments of the present disclosure provide a smart sound dosage monitoring system and method for audio wellness that continually monitors audio dosage levels across multiple devices that may use a personal audio device, such as a headset or an earbud, and provide remedial actions for promoting audio wellness for a user. Whereas traditional sound dosage monitoring was limited in its ability to provide sound level monitoring for a personal audio device when connected to a single computing device, the overall audio wellness of the user could not be accurately ascertained. Embodiments of the present disclosure provide a solution to this problem, among others, using a system and method that seamlessly connects to different devices (e.g., personal computer, computing tablet, smartphone, television, radio, etc.) so that audio dosage levels can be recorded and analyzed in a holistic manner so that audio dosage levels for the user can be accurately ascertained and remediated.

People today are often exposed to noise pollution due to busy lifestyles. Studies now show that hearing damage can be caused by excessive exposure to noise, and in particular hearing damage caused by noise pollution. Noise pollution is a function of both the sound pressure level and the duration of exposure to the sound. Safe listening durations at various loudness levels are known, and can be calculated by averaging audio output levels over time to yield a time-weighted average. Although hearing damage due to background noise exposure can occur, the risk of exposing the user to excessive noise via the user of personal audio devices may also be possible.

Employee wellness is getting to be an important aspect in the corporate and consumer world. Wellness solutions are of very strategic importance to corporation's long term strategy. In general, personal wearable devices currently exist that offer information to users on their stress and level of ergonomic activity. These wearable devices may include heart rate monitors, respiratory rate monitors, and the like. Ear fatigue is emerging to be an important aspect of the overall stress indication of a user. Studies have shown that reducing the ear fatigue can have a major productivity impact on users' productivity and wellness.

Numerous audio generating sources now use personal audio devices, such as earphones, earbuds, earpieces, earspeakers, and the like. As such, many users of personal audio devices often wear the personal audio device most of the day so that they can share the pads across multiple devices. Furthermore, technologies are being developed for seamless handoff of the audio from one device (e.g. PC) to another device (e.g. Smartphone) and vice-versa.

Conventional solutions for monitoring ear fatigue via audio dosage monitors have been implemented on computing devices. Practically, however, they result in a limited solution in that they often only work with a single computing device. Newer pads also include advanced headphone features like Active Noise Cancellation (ANC) where ambient noise is removed such that it does not contribute to additional hearing dosage, and a transparency mode where ambient noise may be mixed with audio that effectively increases the hearing dosage. Therefore, a solution is required to integrate the measured hearing dosage from multiple audio sources to obtain an overall level of audio dosage level that may be incurred by a user.

FIG. 1 illustrates an example sound dosage monitoring and remediation system 100 that may be used to continually monitor audio dosage levels incurred by user across different devices according to one embodiment of the present disclosure. The system 100 generally includes a personal audio device 102 that is capable of providing audio content generated by multiple devices, which in this particular example embodiment, is a computing device IHS 104*a*, a smartphone IHS 104*b*, and a television IHS 104*c* (collectively 104). The computing device IHS 104*a* stores an audio monitoring service that receives multiple, ongoing sound volume measurements from each of the devices 104 over an extended time period to determine a cumulative audio dosage level that the user 110 incurs while using the devices 104. The cumulative audio dosage level may then be used to determine whether the user 110 is receiving excessive audio levels, and if so, provides one or more remedial actions to compensate for the excessive audio levels so that the user's audio wellness may be monitored and remedied if necessary. The computing device IHS 104*a* may be considered to be a main IHS 104*a* because it stores and executes the service 108, which other IHSs 104, such as the smartphone IHS 104*b* and television IHS 104*c* may be considered to be ancillary IHSs 104*b,c* because they do not store and executed the service 108.

To provide a working example, initially the user 110 is listening to audio content generated by the computing IHS 104*a* while at work. During this period of time, the service 108 acquires measurements associated with an audio dosage level incurred by the user 110. Later on after work, the user 110 may be listening to audio content generated by the smartphone 104*b* while commuting home from work. Moreover, when at home, the user 110 may be listening to audio content generated by the television 104*c*. During the time periods when the personal audio device 102 is connected to devices 104*b,c* other than the computing IHS 104*a* (e.g., commuting home from work and at home), the personal audio device 102 may either acquire and transmit the measurements to the service 108 in real-time, such as via a Bluetooth connection, or store the measurements in an internal memory of the personal audio device 102 so that the service 108 can access the measurements when the personal audio device 102 re-connects with the computing IHS 104*a* on the following day. For example, if the user 110 is taking a phone call while at work, the user 110 may connect the personal audio device 102 to the smartphone 104*b* in which the measurements are transferred to the service 108 via known wireless protocols, such as a Bluetooth connection.

The next day when the user 110 returns to work, the audio measurements stored in the personal audio device 102 may be uploaded to the computing IHS 104*a* so that the measurements obtained from the smartphone 104*b* and television 104*c* may be used to determine an overall audio dosage level that has recently incurred. Thus as shown, Because the user 110 is sharing the personal audio device 102 across multiple devices 104 a relatively holistic assessment may be made regarding an overall audio dosage level incurred by the user 110. Accordingly, the system 100 may provide a technique to determine on the basis of strategic use of real time sensors, monitoring of cumulative audio dosage measurement with the personal audio device 102 to accurately determine audio fatigue that may be incurred by the user 110.

The personal audio device 102 may provide various modes of operation, such as an active noise cancellation mode, a transparency mode, a concert mode, and a spatial mode. In one embodiment, the personal audio device 102 may be calibrated for each of its modes. Calibration of personal audio device 102 for each of its modes provides for enhanced accuracy in determining audio dosage levels generated by the personal audio device 102. In the active cancellation mode for example, the personal audio device 102 may be calibrated by measuring and storing the noise attenuation frequency response of the personal audio device 102. In the transparency mode, the personal audio device 102 may be calibrated by measuring and storing the audio capture level of the microphones configured on the personal audio device 102. Additionally, multiple configurations of headphone accuracy may be calibrated if the personal audio device 102 supports beamforming to improve intelligibility while in the transparency mode. In the concert mode, the personal audio device 102 may be calibrated by measuring and storing active audio attenuation levels while in the concert mode. In the spatial mode, the personal audio device 102 may be calibrated by analyzing and storing the impact or change of audio levels as a result enabling the spatial audio mode. Although only an active noise cancellation mode, a transparency mode, a concert mode, and a spatial mode are described herein, it should be appreciated that calibrations of other modes may be performed on the personal audio device 102 without departing from the spirit and scope of the present disclosure.

In one embodiment, the personal audio device 102 an audio volume to Sound Pressure Level (SPL) calibration may be performed to ensure that mapping of measured values of audio volume are accurately mapped to a SPL of the personal audio device 102 from which the audio dosage levels may be determined. For example, a certain volume level of a voice sound (e.g., person talking) may exhibit a different SPL than what would be exhibited by an audio sound (e.g., pop song). The calibration can be saved for various modes supported by the Headphones. For example, the system 100 may calibrate and store an audio volume to SPL level table for a voice mode of operation. Such an SPL level table may be used when the personal audio device 102 is connected using Headphones (HFP) Profiles to the computing IHS 104*a*. The system 100 may also calibrate and store an audio volume to SPL level table for use in an audio mode of operation. The table may be used when the personal audio device 102 is connected using Advanced Audio (A2DP) Profiles to the computing IHS 104*a*. The system 100 may also calibrate and store a volume to SPL level table for use in a Low Energy (LE) Audio Mode. This table may be used when the personal audio device 102 is connected using Generic Audio Profiles or Hearing Aid Profiles to the computing IHS 104*a*. Volume to SPL level tables can be extended to all the supported Bluetooth Profiles and CODECs provided on the personal audio device 102. In other embodiments, the aforementioned calibrations can be downloaded from an online portal, such as one operated by a vendor of the personal audio device 102.

The system 100 may provide for one or more remedial action to compensate for excessive audio dosage levels. In one embodiment, the system 100 may use an audio sound level monitor using the speaker driver sensitivity and frequency response to calculate the sound dosage level (e.g., exposure) integrated over time. In certain cases, the sound dosage level can be calculated using a DSP level calculator configured in the personal audio device 102. The measurements can be obtained based on various criteria. For example, continual, ongoing measurements may be obtained periodically at a defined cadence and/or when the system 100 detects a certain amount of audio level changes in an adaptive gain control circuit of the personal audio device 102. Continual, ongoing measurements may also be made each time a volume change of the personal audio device 102 is performed, such as when a Bluetooth command is executed for requesting a low power consumption level of DSP operation.

Environmental sound level monitoring and exposure calculations can be performed by tracking the pad's mode of operation. When transparency mode is turned on, environmental noise is aggregated thus improving the accuracy of environmental noise impact on overall hearing dosage. Alternatively, when Active Noise Cancellation (ANC) is turned on, the impact of environmental noise is reduced based on pre-calibrated ANC noise reduction characteristics of the personal audio device 102. The following model for hearing dosage aggregation can be applied:

$$D=\sum_{a=0}^{n}\frac{100T}{T_c}10^{(Li-Lc)/q}+\sum_{b=0}^{n}\frac{100T}{T_c}10^{(Li-Lc)/q}+\sum_{c=0}^{n}\frac{100T}{T_c}10^{(Li-Lc)/q}$$

where,

T is Measurement Duration;

Tc is Contextual Usage-Mode Time;

Li is Measured Level;

Lc is Contextual Usage-Mode Level;

q=Fatigue factor (a 3 dB increase in noise level results in doubling of hearing energy);

a=Audio consumption durations with no ANC;

b=Transparency Mode durations; and c=Audio consumption durations with ANC

Diverse levels of Spatial Voice/Audio can be enabled in the devices 104. The impact on audio fatigue can be compensated depending on the type of spatial processing enabled. Various techniques for detection and compensation may be used. For example, headtracking information may be enabled in the personal audio device 102 if it is so equipped. The IHS 104 can confirm using Bluetooth capability discovery procedures to determine whether the IHS 104 is capable of spatial audio processing. A spatial voice feature may be enabled in a collaboration application (e.g., Zoom, Teams, etc.) and corresponding enablement of the spatial voice feature can be sent to the personal audio device 102 using any suitable process. For example, enablement of the spatial voice can be sent to the personal audio device 102 using a service update procedure. Additionally, the metadata related to the spatial voice feature, such as the number of attendees, a size of the screen can be sent using Bluetooth Low Energy (BLE) procedures such that the spatial audio feature may applied in the personal audio device 102 to apply hearing dosage compensation. Yet another detection and compensation technique may involve enough microphones on the personal audio device 102 to support creation of mono, stereo, binaural, and/or an immersive format like First Order Ambisonics implemented in certain (virtual, augmented, mixed) reality (XR) devices. The hearing dosage can be compensated based on the audio processing algorithm in progress. In certain cases, compensation can be applied by the IHS 104 when pad hearing dosage data and metadata is shared back to the IHS 104.

The personal audio device 102 tracks the duration of time it was used with the system 100 and sends the tracked duration data to the IHS 104*a* so that the overall usage of the personal audio device 102 may be tracked by the service 108 on the IHS 104*a*. The measurements of the audio dosage level from the personal audio device 102 can be aggregated with the measurements of hearing dosage from the IHS 104*a* to provide complete hearing dosage information so that active remediation can be triggered as described herein below.

Monitoring of the hearing dosage can be used to provide active feedback to the user 110 for hearing protection. Several techniques exist to provide active feedback to the users, and how the remediation techniques are used can be activated based on device/user policies stored in the IHS 104*a*. Active interventions may be used when unfavorable audio fatigue conditions are encountered, or conditions are deteriorating, and opportunities exist to improve or maximizing the audio wellness of the user 110. Audio processing of the personal audio device 102 can be updated when audio dosage levels exceed certain threshold levels. A few examples may include Automatic Gain Control (AGC) to reduce the gain level of the personal audio device 102, enable Active Noise Cancellation (ANC) on the personal audio device 102 to reduce the audio dosage level, request the IHS 104*a* to enable spatial audio techniques, and applying adaptive frequency response equalization to reduce audio dosage levels. For example, the service 108 may deploy frequency band equalization (e.g., via the DSP) in the personal audio device 102 to reduce hearing fatigue.

In one embodiment, the service 108 may implement personalization or customization of the frequency response equalization based on a measured response of the user's unique hearing capabilities. For example, the service 108 may receive information included in an audiologist report describing measurements conducted on the hearing capabilities of the user 110 over certain audio frequency ranges. Using the audiologist report, the service 108 may setup a high volume to compensate for hearing loss in a few specific frequency bands, while lowering the volume in other frequency bands. Additionally, the service 108 may use the audiology report to provide a compensation mechanism where the target tonal component can be boosted while overall volume can be reduced for lower hearing dosage.

The service 108 may also provide a historical sound dosage exposure and identify sound levels, environmental noise patterns to assist users. For example, the service 108 may generate a user notification message indicating an overall audio wellness score for the user's consumption. The user notification may be generated at periodic, ongoing intervals, and/or may be generated when the audio dosage levels exceed certain thresholds. In one embodiment, the service 108 may use a Machine Learning (ML) engine to learn about the user's audio listening habits, and in some cases, in relation to the user's activities that were done when those audio listening habits were exhibited. In one embodiment, the service 108 may use a ML engine that includes features, or form a part of, the DELL PRECISION OPTIMIZER provided by DELL ENTERPRISES. In general, the ML engine provides an efficient way to look for patterns in the data, inference, and assist users to optimizing conditions such that the user has the best opportunity to improve or maximize their audio wellness score. The ML engine may also provide telemetric based pattern recognition over a period to determine the optimally effective user response to prompts. This will be based on a more holistic view of user activities in the audio exposure conditions and adaptability to high variations in workload or exposures rather than fixed intervals or based on limited data.

The service 108 uses the ML engine to monitor resources of the IHS 104 along with telemetry data obtained directly from sensors configured in the personal audio device 102 to characterize the user's audio listening habits. The ML engine may obtain data from the resources of the IHS 104 in addition to telemetry data from the sensors to generate one or more ML-based hints associated with the user's audio listening habits. Once the ML engine has collected characteristics over a period of time, it may then process the collected data using statistical descriptors to extract the audio listening habits. For example, the ML engine may monitor the personal audio device 102 using sensors configured in the personal audio device 102 to determine the user's activity and adjust audio parameters of the personal audio device 102 according to the detected user's activity. To provide a particular example, if the ML engine detects that the user 110 is jogging, the service 108 infers that the user is outside and adjusts the audio parameters to include environmental sounds by turning the ANC off. Later on when the ML engine detects that the user is sitting at home in the evening and listening to music, the service 108 may adjust the audio parameters to include spatial audio content. The next day the ML engine may detect that the user 110 is again at work conducting a teleconference, the service 108 may again adjust the audio parameters to optimize the level of audio content for voice communications. The ML engine may use any suitable machine learning algorithm such as, for example, a Bayesian algorithm, a Linear Regression algorithm, a Decision Tree algorithm, a Random Forest algorithm, a Neural Network algorithm, or the like. Additionally, the ML engine may be executed on the computing device IHS 104*a* or on a cloud portal 302 as described herein below with reference to FIG. 3.

Figure 2:
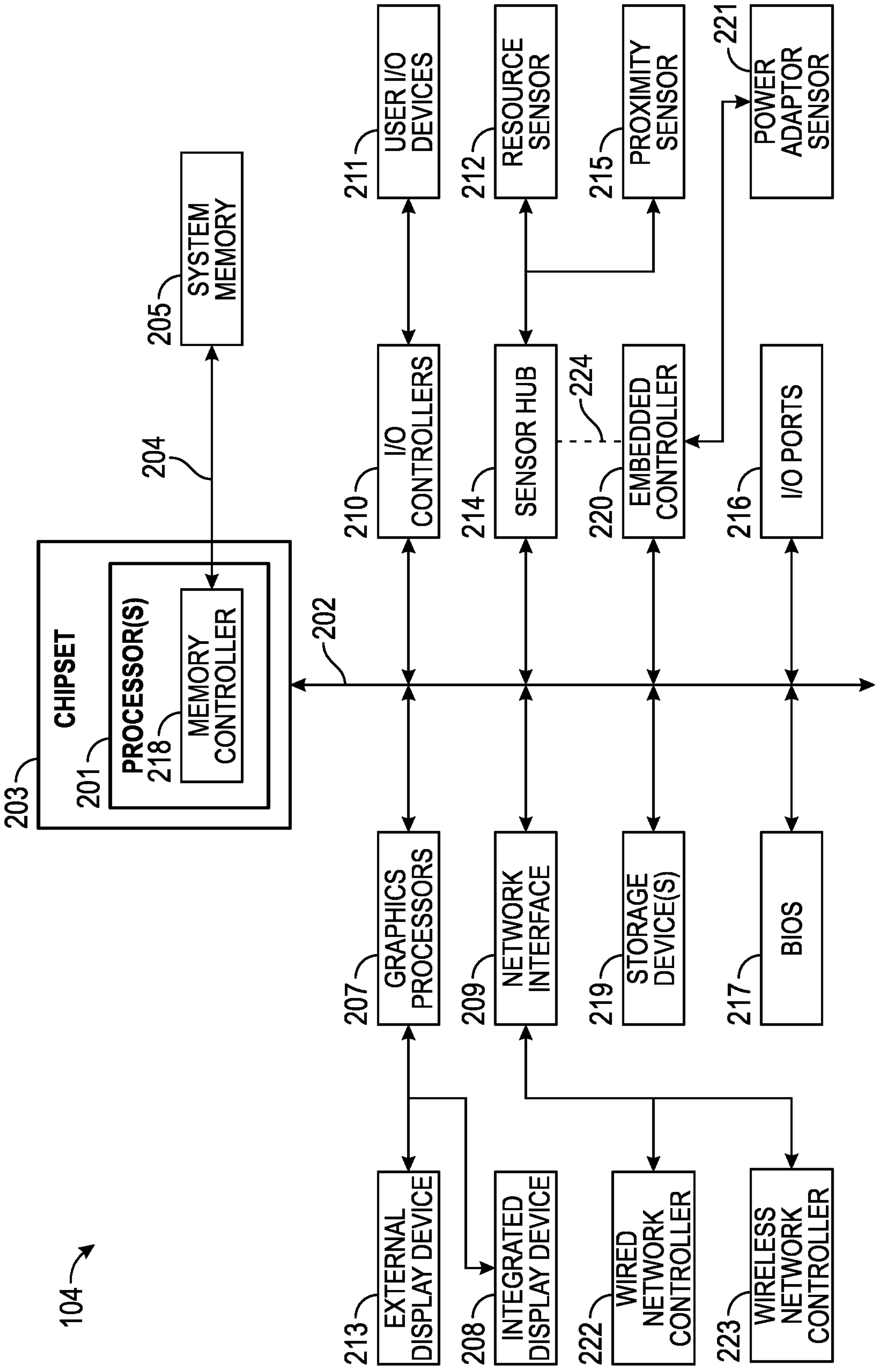
FIG. 2 is a block diagram illustrating components of an example IHS that may be configured to manage performance optimization of applications according to one embodiment of the present disclosure.

FIG. 2 is a block diagram illustrating components of an example IHS 104 that may be configured to manage performance optimization of applications according to one embodiment of the present disclosure. IHS 104 may be incorporated in whole, or part, as IHS 104 of FIG. 1. As shown, IHS 104 includes one or more processors 201, such as a Central Processing Unit (CPU), that execute code retrieved from system memory 205. Although IHS 104 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 104 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 104 utilizes chipset 203 that may include one or more integrated circuits that are connected to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 202. In IHS 104, bus 202 is illustrated as a single element. Various embodiments may utilize any number of separate buses to provide the illustrated pathways served by bus 202.

In various embodiments, IHS 104 may include one or more I/O ports 216 that may support removable couplings with diverse types of external devices and systems, including removable couplings with peripheral devices that may be configured for operation by a particular user of IHS 104. For instance, I/O 216 ports may include USB (Universal Serial Bus) ports, by which a variety of external devices may be coupled to IHS 104. In addition to or instead of USB ports, I/O ports 216 may include diverse types of physical I/O ports that are accessible to a user via the enclosure of the IHS 104.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 104 via network interface 209. In various implementations, I/O controller 210 may support the operation of one or more user I/O devices 211 such as a keyboard, mouse, touchpad, touchscreen, microphone, speakers, camera and other input and output devices that may be coupled to IHS 104. User I/O devices 211 may interface with an I/O controller 210 through wired or wireless couplings supported by IHS 104. In some cases, I/O controllers 210 may support configurable operation of supported peripheral devices, such as user I/O devices 211.

As illustrated, a variety of additional resources may be coupled to the processor(s) 201 of the IHS 104 through the chipset 203. For instance, chipset 203 may be coupled to network interface 209 that may support distinct types of network connectivity. IHS 104 may also include one or more Network Interface Controllers (NICs) 222 and 223, each of which may implement the hardware required for communicating via a specific networking technology, such as Wi-Fi, BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support distinct types of network connectivity, such as the network connectivity utilized by IHS 104.

Chipset 203 may also provide access to one or more display device(s) 208 and 213 via graphics processor 207. Graphics processor 207 may be included within a video card, graphics card or within an embedded controller installed within IHS 104. Additionally, or alternatively, graphics processor 207 may be integrated within processor 201, such as a component of a system-on-chip (SoC). Graphics processor 207 may generate Display information and provide the generated information to one or more Display device(s) 208 and 213, coupled to IHS 104.

One or more Display devices 208 and 213 coupled to IHS 104 may utilize LCD, LED, OLED, or other Display technologies. Each Display device 208 and 213 may be capable of receiving touch inputs such as via a touch controller that may be an embedded component of the Display device 208 and 213 or graphics processor 207, or it may be a separate component of IHS 104 accessed via bus 202. In some cases, power to graphics processor 207, integrated Display device 208 and/or external Display device 213 may be turned off, or configured to operate at minimal power levels, in response to IHS 104 entering a low-power state (e.g., standby).

As illustrated, IHS 104 may support an integrated Display device 208, such as a Display integrated into a laptop, tablet, 2-in-1 convertible device, or mobile device. IHS 104 may also support use of one or more external Display devices 213, such as external monitors that may be coupled to IHS 104 via distinct types of couplings, such as by connecting a cable from the external Display devices 213 to external I/O port 216 of the IHS 104. In certain scenarios, the operation of integrated displays 208 and external displays 213 may be configured for a particular user. For instance, a particular user may prefer specific brightness settings that may vary the Display brightness based on time of day and ambient lighting conditions.

Chipset 203 also provides processor 201 with access to one or more storage devices 219. In various embodiments, storage device 219 may be integral to IHS 104 or may be external to IHS 104. In certain embodiments, storage device 219 may be accessed via a storage controller that may be an integrated component of the storage device. Storage device 219 may be implemented using any memory technology allowing IHS 104 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 104 also includes Basic Input/Output System (BIOS) 217 that may be stored in a non-volatile memory accessible by chipset 203 via bus 202. Upon powering or restarting IHS 104, processor(s) 201 may utilize BIOS 217 instructions to initialize and test hardware components coupled to the IHS 104. BIOS 217 instructions may also load an operating system (OS) (e.g., WINDOWS, MACOS, iOS, ANDROID, LINUX, etc.) for use by IHS 104.

BIOS 217 provides an abstraction layer that allows the operating system to interface with the hardware components of the IHS 104. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 104 embodiments may utilize sensor hub 214 capable of sampling and/or collecting data from a variety of sensors. For instance, sensor hub 214 may utilize hardware resource sensor(s) 212, which may include electrical current or voltage sensors, and that are capable of determining the power consumption of various components of IHS 104 (e.g., CPU 201, GPU 207, system memory 205, etc.). In certain embodiments, sensor hub 214 may also include capabilities for determining a location and movement of IHS 104 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 104, absence from IHS 104, and/or distance from IHS 104 (e.g., near-field, mid-field, or far-field).

In certain embodiments, sensor hub 214 may be an independent microcontroller or other logic unit that is coupled to the motherboard of IHS 104. Sensor hub 214 may be a component of an integrated system-on-chip incorporated into processor 201, and it may communicate with chipset 203 via a bus connection such as an Inter-Integrated Circuit ($I^2C$) bus or other suitable type of bus connection. Sensor hub 214 may also utilize an $I^2C$ bus for communicating with various sensors supported by IHS 104.

As illustrated, IHS 104 may utilize embedded controller (EC) 220, which may be a motherboard component of IHS 104 and may include one or more logic units. In certain embodiments, EC 220 may operate from a separate power plane from the main processors 201 and thus the OS operations of IHS 104. Firmware instructions utilized by EC 220 may be used to operate a secure execution system that may include operations for providing various core functions of IHS 104, such as power management, management of operating modes in which IHS 104 may be physically configured and support for certain integrated I/O functions.

EC 220 may also implement operations for interfacing with power adapter sensor 221 in managing power for IHS 104. These operations may be utilized to determine the power status of IHS 104, such as whether IHS 104 is operating from battery power or is plugged into an AC power source (e.g., whether the IHS is operating in AC-only mode, DC-only mode, or AC+DC mode). In some embodiments, EC 220 and sensor hub 214 may communicate via an out-of-band signaling pathway or bus 224.

In various embodiments, IHS 104 may not include each of the components shown in FIG. 2. Additionally, or alternatively, IHS 104 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

Figure 3:
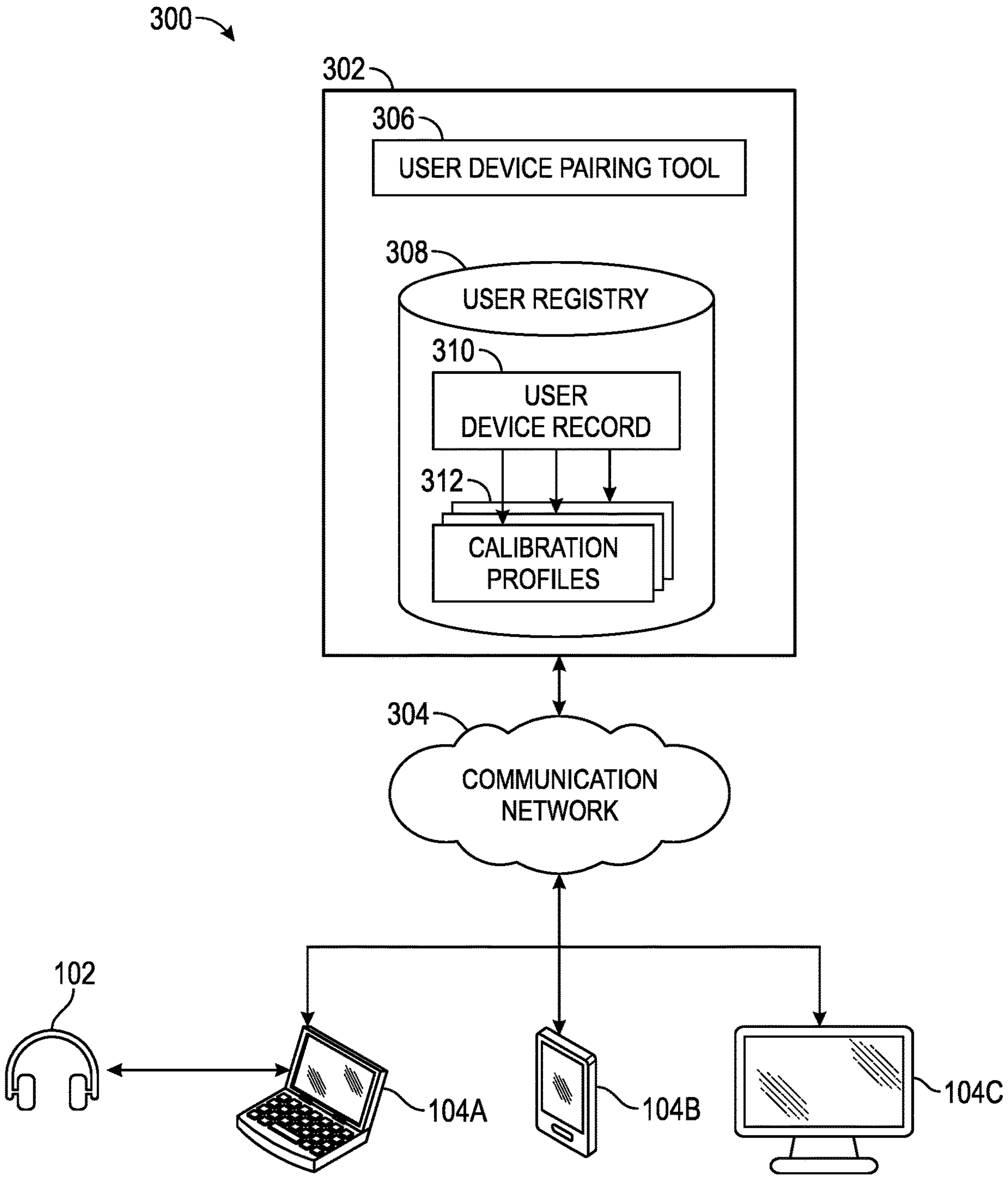
FIG. 3 illustrates an example embodiment showing how the personal audio device 102 may be paired with multiple IHSs used by the user according to one embodiment of the present disclosure.

FIG. 3 illustrates an example embodiment showing how the personal audio device 102 may be paired with multiple IHSs 104 used by the user 108 according to one embodiment of the present disclosure. In this particular embodiment, the computing device IHS 104*a*, smartphone IHS 104*b*, and television IHS 104*c* are in communication with a cloud portal 302 via a communication network 304. The cloud portal 302 is configured with a user device pairing tool 306, a user registry 308 that stores a user device record 310 and associated calibration profiles 312 for the personal audio device 102. Although only one user device record 310 is shown and described herein, it should be appreciated that the cloud portal 302 may store and maintain multiple user device records 310 and associated calibration profiles 312 for multiple users of the cloud portal 302.

The user device record 310 stores information associated with IHSs 104 that are registered for use by the user 110 with the cloud portal 302. For example, the user device record 310 may store a Globally Unique ID (GUID) and a network address of the computing device IHS 104*a*, smartphone IHS 104*b*, and television IHS 104*c* used by the user 110 that were obtained from either the user or IHS 104 when it was registered with the cloud portal 302. The user device record 310 is also associated with one or more calibration profiles 312 as described herein above. The user device pairing tool 306 may receive the information to be included in the user device record 310 as the IHS 104 is registered for use with the cloud portal 302, such as subsequent to the user 110 taking constructive possession of the IHS 104 from its vendor.

When the user 110 initially pairs the personal audio device 102 with the computing device IHS 104*a*, the service 108 may communicate with the user device pairing tool 306 to provide a link key and/or other suitable information used to pair the personal audio device 102 with the IHS 104*a*. The tool 302 may then store the link key and other link information in the user device record 310 that will be used to pair the personal audio device 102 with other IHSs 104 used by the user 110. Thus, whenever a new IHS 104 is registered for use with the cloud portal 302, the user device pairing tool 306 may automatically pair the personal audio device 102 with the newly registered IHS 104. If the IHS 104 has been previously registered for use with the cloud portal 302, the user device pairing tool 306 may immediately communicate with each of the previously registered IHSs 104 to be paired with the personal audio device 102 using the link information stored in the user device record 310.

In one embodiment, the calibration profiles 312 may be obtained from software provided to the user 110 when the personal audio device 102 was procured. That is, installation software provided with the personal audio device 102 may include calibration profiles 312 that can be uploaded either manually or automatically by the service 108 on the computing device IHS 104*a*. In other embodiments, the calibration profiles 312 may be generated by the service 108 as the personal audio device 102 is being used based on telemetry data obtained during use of the personal audio device 102 with each of the IHSs 104. Thus as can be seen, when the user 110 initially pairs the personal audio device 102 with the commuting device IHS 104*a*, the cloud-based user device pairing tool 306 may automatically pair the personal audio device 102 with other IHSs 104 registered for use with the cloud portal 302.

Figure 4:
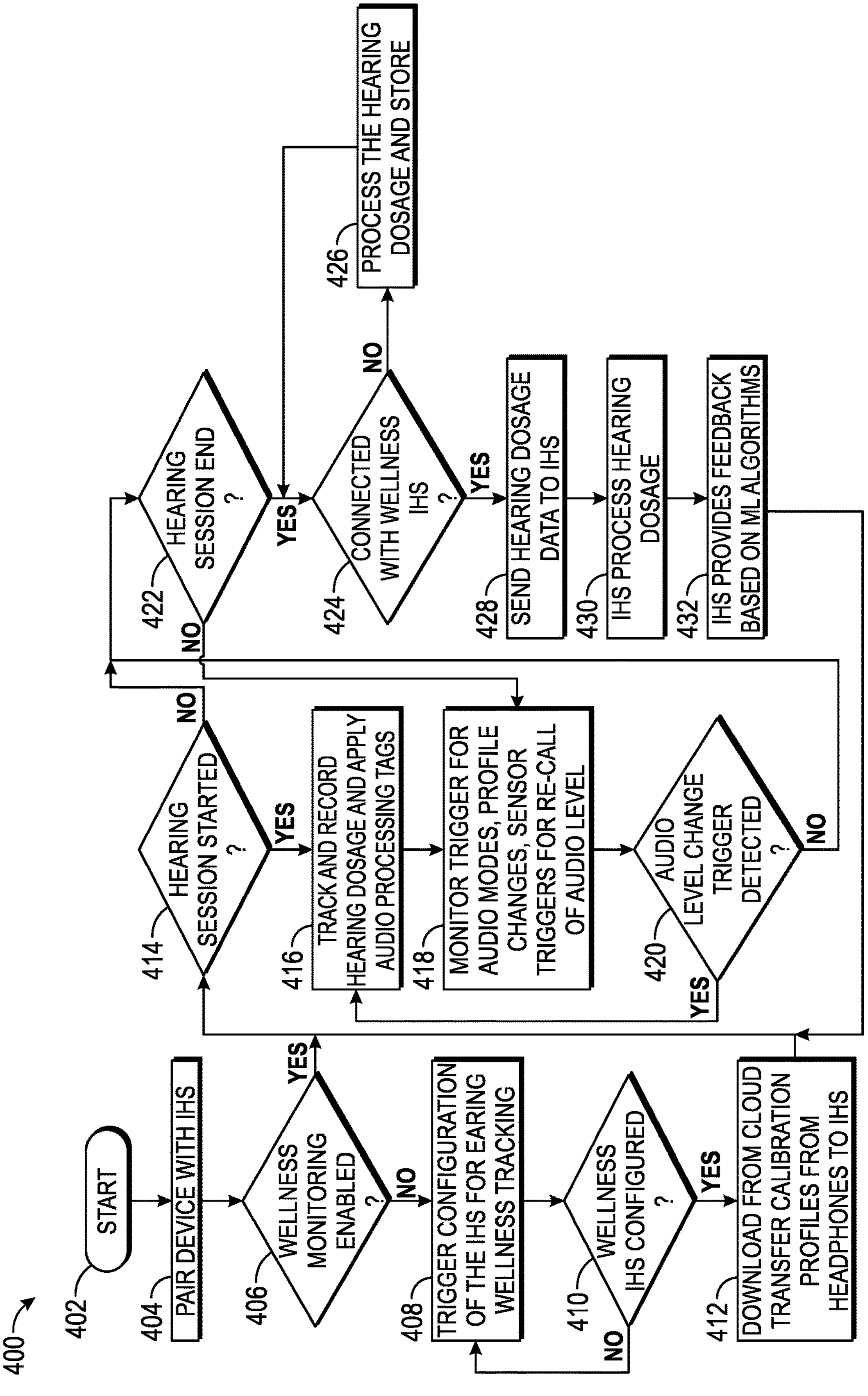
FIG. 4 illustrates an example sound monitoring and remediation method that may be performed to monitor and remediate audio dosage levels incurred by the user according to one embodiment of the present disclosure.

FIG. 4 illustrates an example sound monitoring and remediation method 400 that may be performed to monitor and remediate audio dosage levels incurred by the user 110 according to one embodiment of the present disclosure. Additionally or alternatively, certain steps of the sound monitoring and remediation method 400 may be performed by the service 108 and/or user device pairing tool 306 described herein above. The service 108 and associated ML engine may be executed in the background to continually obtain information about the audio listening habits of the user 110. In other embodiments, the service 108 and ML engine may be started and stopped manually, such as in response to user input.

At step 402, the method 400 begins. At step 404, the method 400 pairs the personal audio device 102 with an IHS 104. For example, the method 400 may pair the personal audio device 102 with a personal computing device 104*a* operated by the user 110. In one embodiment, the method 400 may pair other IHSs 104 registered for use with the user 110 using a cloud portal 302. Although steps 406-432 are described herein below in terms of a single IHS 104, it should be understood that those steps may be performed for each IHS 104 that is registered for use with the sound monitoring and remediation system.

The method 400 then determines whether audio wellness monitoring has been enabled at step 406. If so, processing continues at step 414; otherwise, processing continues at step 408 in which the IHS 104*a* is configured for audio wellness tracking. For example, the method 400 may launch the service 108 on the IHS 104*a*, and upon being launched, the service 108 may perform certain initialization actions, such as forming bindings to the various audio sources (e.g., music player, teleconferencing tool, web browser, etc.) in the IHS 104*a*, and allocating sufficient memory space. At step 410, the method 400 ensures that the service 108 has been started.

When the service 108 has been started, processing continues at step 412 where the method 400 obtains calibration profiles 312 for the personal audio device 102. As described previously, the calibration profiles 312 may be used to, among other things, effectively normalize measurements obtained from use of the personal audio device 102 so that an accurate determination of audio dosage levels may be obtained. The method 400 may obtain the calibration profiles 312 from any suitable source. In one embodiment, the method 400 may obtain the calibration profiles 312 from the cloud portal 302, or from an online support website managed by a vendor of the personal audio device 102. In another embodiment, the method 400 may obtain the calibration profiles from a memory unit configured in the personal audio device 102.

In general, steps 404 through 412 generally describe a sequence of steps that may be performed when the service 108 is initialized for use with the user's IHSs 104, or each time a new IHS 104 is configured for use with the service 108. Steps 414 through 432, on the other hand, may be performed each time an audio session is conducted using the personal audio device 102 with an IHS 104 of the user 110. Nevertheless, when use of the method 400 is no longer needed or desired, the process ends.

At step 414, the method 400 determines whether an audio session has started on the IHS 104. An audio session generally refers to a time-delimited link between an audio source (e.g., music player, teleconferencing tool, web browser, etc.) and the personal audio device 102 in which audio content is being generated for play on the personal audio device 102. For example, an audio session may be a teleconference session that is conducted among two or more people at a time. If an audio session has not yet started, processing continues at step 422; otherwise, processing continues at step 416 in which the method 400 begins receiving measurements associated with an audio dosage level incurred by a user 110. In one embodiment, the method 400 may also apply audio processing tags that may be used in post-processing to, among other things, synchronize the recorded measurements with data obtained from other sensors in the IHS 104 and/or personal audio device 102.

The method 400 at step 418 also monitors the audio session for changes in audio mode (e.g., ANC mode, transparency mode, concert mode, spatial mode, etc.), profile changes, and sensors configured in the IHS 104 and personal audio device 102 that may trigger re-calibration of the audio parameters (e.g., amplitude, frequency band equalization, spatial audio settings, etc.) of the audio content. At step 420, the method 400 determines whether the ongoing audio session has generated any triggers to adjust the audio parameters. If not, processing continues at step 422; otherwise, processing reverts to step 416 to continue receiving measurements associated with an audio dosage level incurred by a user 110.

At step 422, the method 400 determines whether the audio session has ended. If not, processing continues at step 418; otherwise, processing continues at step 424 in which the method 400 then determines whether the current audio session is being conducted by the computing device IHS 104*a* of the user 110. That is, the method 400 determines whether the audio session is being generated by and ancillary IHS 104; that is, an audio source on the same IHS on which the service 108 is being executed. If not, processing continues at step 426 in which the method 400 processes and stores the measurements taken during the audio session. In one embodiment, the ancillary IHS 104 may process the recorded measurements to derive the audio dosage levels. In other embodiments, the ancillary IHS 104 may send the measurements (e.g., raw data) to the main IHS 104*a* to be processed by the main IHS 104*a* to derive the audio dosage levels. Thereafter at step 428, the method 400 sends the measurements and/or audio dosage data to the main IHS 104*a*. It should be understood that steps 426 and 428 are optional due to scenarios in which the personal audio device 102 sends measurements and/or processes audio dosage level data to the main IHS 104*a* in real-time through a communication link established between the main IHS 104*a* and personal audio device 102.

At step 430, the method 400 processes the audio dosage data. In one embodiment, the main IHS 104*a* executing the service 108 may process the audio dosage data to, among other things, determine if the audio dosage data is excessive, and if so, perform one or more remedial actions to reduce the audio dosage level. Examples of remedial actions that may be taken may include adjusting a gain level of the personal audio device, enable active noise cancellation on the personal audio device, enable a spatial audio technique on the IHS, adjust a frequency response level of the first or second audio source, boosting a volume of the first or second audio source, and attenuating a volume of the first or second audio source.

At step 432, the method 400 may also utilize a ML engine to infer additional recommendations in the form of feedback to the user 110. For example, the ML engine may generate an inference that listening to a particular radio program while performing a daily exercise may be causing excessive fatigue to the user's ears. As such, the ML engine may cause the service 108 to generate a notification message indicating such information for the user's consumption. Thereafter, the method 400 continues at step 414 to process future audio sessions for determining a cumulative audio dosage level incurred by the user 110. In general, steps 414 through 432 may be performed each time an audio session is conducted using the personal audio device 102 with an IHS 104 of the user 110. Nevertheless, when use of the method 400 is no longer needed or desired, the process ends.

Although FIG. 4 describes an example method 400 that may be performed to monitor and remediate audio dosage levels incurred by a user, the features of the method 400 may be embodied in other specific forms without deviating from the spirit and scope of the present disclosure. For example, the method 400 may perform additional, fewer, or different operations than those described in the present examples. For another example, the method 400 may be performed in a sequence of steps different from that described above. As yet another example, certain steps of the method 400 may be performed by other components other than those described above. For example, certain steps of the aforedescribed method 400 may be performed by a cloud-based service.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterward be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) orchestration system, comprising:

at least one processor; and at least one memory coupled to the at least one processor, the at least one memory having program instructions stored thereon that, upon execution by the at least one processor, cause the IHS to:

receive, by a personal audio device, a plurality of measurements associated with an audio dosage level incurred by a user over a specified period of time, a first portion of the measurements obtained when the audio dosage level is generated by a first audio source and a second portion of the measurements obtained when the audio dosage level is generated by a second audio source, wherein the first and second audio sources each comprise electronic devices that generate audio signals associated with the audio dosage level;

calibrate the personal audio device according to each of a plurality of modes, wherein the modes comprise a transparency mode, an active noise cancellation mode, a spatial mode, and a concert mode;

determine that a cumulative audio dosage level for the specified period of time is excessive, the cumulative audio dosage level obtained by combining the first portion and second portion of measurements; and when the cumulative audio dosage level is excessive, perform one or more remedial actions to reduce the audio dosage level.

2. The IHS of claim 1, wherein the first audio source comprises the IHS, and the second audio source is a different device than the IHS.

3. The IHS of claim 2, wherein the program instructions, upon execution, further cause the IHS to, when the personal audio device is generating sound from the second audio source, receive the second portion of measurements in real-time from the personal audio device.

4. The IHS of claim 2, wherein the program instructions, upon execution, further cause the IHS to when the personal audio device is generating sound from the second audio source, receive the second portion of measurements when the personal audio device re-connects with the IHS, the second portion of the measurements stored in real-time on the personal audio device.

5. The IHS of claim 1, wherein the program instructions, upon execution, further cause the IHS to:

perform a Machine Learning (ML) process to:

gather data associated with one or more activities of the user as the user is using the personal audio device; and infer, using the data, one or more recommendations for improving a hearing wellness level of the user.

6. The IHS of claim 5, wherein the program instructions, upon execution, further cause the IHS to implement the recommendations, wherein the recommendations comprise at least one of a user notification that informs the user about the recommendations, or adjusting an audio parameter of the first or second audio source.

7. The IHS of claim 1, wherein the program instructions, upon execution, further cause the IHS to map the measurements from a volume level to the audio dosage level according to a type of the audio dosage level.

8. The IHS of claim 1, wherein the remedial actions comprise at least one of adjusting a gain level of the personal audio device, enable active noise cancellation on the personal audio device, enable a spatial audio technique on the IHS, adjust a frequency response level of the first or second audio source, boosting a volume of the first or second audio source, and attenuating a volume of the first or second audio source.

9. The IHS of claim 1, wherein the program instructions, upon execution, further cause the IHS to adjust a volume one or more frequency ranges of the first or second audio source based on an audiology report associated with the user.

10. A method comprising:

receiving, by a personal audio device, a plurality of measurements associated with an audio dosage level incurred by a user over a specified period of time, a first portion of the measurements obtained when the audio dosage level is generated by a first audio source and a second portion of the measurements obtained when the audio dosage level is generated by a second audio source, wherein the first and second audio sources each comprise electronic devices that generate audio signals associated with the audio dosage level;

calibrating the personal audio device according to each of a plurality of modes, wherein the modes comprise a transparency mode, an active noise cancellation mode, a spatial mode, and a concert mode;

determining that a cumulative audio dosage level for the specified period of time is excessive, the cumulative audio dosage level obtained by combining the first portion and second portion of measurements; and when the cumulative audio dosage level is excessive, performing one or more remedial actions to reduce the audio dosage level.

11. The method of claim 10, further comprising, when the personal audio device is generating sound from the second audio source, receiving the second portion of measurements in real-time from the personal audio device, wherein the first audio source comprises the IHS, and the second audio source is a different device than the IHS.

12. The method of claim 10, further comprising when the personal audio device is generating sound from the second audio source, receiving the second portion of measurements when the personal audio device re-connects with the IHS, the second portion of the measurements stored in real-time on the personal audio device, wherein the first audio source comprises the IHS, and the second audio source is a different device than the IHS.

13. The method of claim 10, further comprising performing a Machine Learning (ML) process to gather data associated with one or more activities of the user as the user is using the personal audio device, and infer, using the data, one or more recommendations for improving a hearing wellness level of the user.

14. The method of claim 13, further comprising implementing the recommendations, wherein the recommendations comprise at least one of a user notification that informs the user about the recommendations, or adjusting an audio parameter of the first or second audio source.

15. The method of claim 10, further comprising mapping the measurements from a volume level to the audio dosage level according to a type of the audio dosage level.

16. The method of claim 10, further comprising adjusting a volume one or more frequency ranges of the first or second audio source based on an audiology report associated with the user.

17. A memory storage device having program instructions stored thereon that, upon execution by one or more processors of an Information Handling System (IHS), cause the IHS to:

receive, by a personal audio device, a plurality of measurements associated with an audio dosage level incurred by a user over a specified period of time, a first portion of the measurements obtained when the audio dosage level is generated by a first audio source and a second portion of the measurements obtained when the audio dosage level is generated by a second audio source, wherein the first and second audio sources each comprise electronic devices that generate audio signals associated with the audio dosage level;

calibrate the personal audio device according to each of a plurality of modes, wherein the modes comprise a transparency mode, an active noise cancellation mode, a spatial mode, and a concert mode;

determine that a cumulative audio dosage level for the specified period of time is excessive, the cumulative audio dosage level obtained by combining the first portion and second portion of measurements; and when the cumulative audio dosage level is excessive, perform one or more remedial actions to reduce the audio dosage level.

18. The memory storage device of claim 17, wherein the program instructions, upon execution, further cause the IHS to:

perform a Machine Learning (ML) process to:

gather data associated with one or more activities of the user as the user is using the personal audio device; and infer, using the data, one or more recommendations for improving a hearing wellness level of the user.

19. The memory storage device of claim 18, wherein the program instructions, upon execution, further cause the IHS to implement the recommendations, wherein the recommendations comprise at least one of a user notification that informs the user about the recommendations, or adjusting an audio parameter of the first or second audio source.

20. The memory storage device of claim 17, wherein the remedial actions comprise at least one of adjusting a gain level of the personal audio device, enable active noise cancellation on the personal audio device, enable a spatial audio technique on the IHS, adjust a frequency response level of the first or second audio source, boosting a volume of the first or second audio source, and attenuating a volume of the first or second audio source.

* * * * *